(12) United States Patent
Lee et al.

(10) Patent No.: US 9,374,002 B2
(45) Date of Patent: Jun. 21, 2016

(54) SWITCH CONTROL CIRCUIT, COUPLED INDUCTOR BOOST CONVERTER INCLUDING THE SAME, AND DRIVING METHOD OF THE COUPLED INDUCTOR BOOST CONVERTER

(71) Applicant: FAIRCHILD KOREA SEMICONDUCTOR LTD., Bucheon (KR)

(72) Inventors: Jae-Yong Lee, Seongnam-si (KR); Young Sik Lee, Seoul-si (KR); Young-Bae Park, Anyang (KR); Young-Je Lee, Bucheon-si (KR); Eunsung Jang, Suwon (KR)

(73) Assignee: Fairchild Korea Semiconductor LTD (KR)

( * ) Notice: Subject to any disclaimer, the term of this patent is extended or adjusted under 35 U.S.C. 154(b) by 223 days.

(21) Appl. No.: 13/889,704

(22) Filed: May 8, 2013

(65) Prior Publication Data

US 2013/0300390 A1    Nov. 14, 2013

(30) Foreign Application Priority Data

May 8, 2012    (KR) .................. 10-2012-0048813

(51) Int. Cl.
*H02M 3/156*    (2006.01)
*H02M 1/08*    (2006.01)
*H02M 3/158*    (2006.01)

(52) U.S. Cl.
CPC ............ *H02M 3/1563* (2013.01); *H02M 1/083* (2013.01); *H02M 3/156* (2013.01); *H02M 3/158* (2013.01); *H02M 3/1588* (2013.01)

(58) Field of Classification Search
CPC ................ H02M 2006/0058; H02M 3/156; H02M 1/083; H02M 3/1563; H02M 3/158; H02M 3/1588; Y02B 70/1491
See application file for complete search history.

(56) References Cited

U.S. PATENT DOCUMENTS

| | | | | |
|---|---|---|---|---|
| 5,067,066 A | * | 11/1991 | Chida | ............................ 363/16 |
| 7,023,186 B2 | * | 4/2006 | Yan | ....................... H02M 3/155 323/224 |
| 2009/0184668 A1 | * | 7/2009 | Mednik et al. | ................. 315/297 |
| 2010/0148730 A1 | * | 6/2010 | Choi | ......................... H02J 7/08 320/145 |
| 2011/0013437 A1 | * | 1/2011 | Uruno | ................. H02M 1/4208 363/126 |
| 2011/0095733 A1 | * | 4/2011 | Park et al. | ...................... 323/207 |
| 2012/0013313 A1 | * | 1/2012 | Moussaoui | ........... H02M 3/005 323/235 |
| 2012/0262139 A1 | * | 10/2012 | Moussaoui | ............. H02M 1/44 323/282 |

* cited by examiner

*Primary Examiner* — Fred E Finch, III
*Assistant Examiner* — Rafael O De Leon Domenech
(74) *Attorney, Agent, or Firm* — Grossman Tucker Perreault & Pfleger PLLC

(57) ABSTRACT

The present invention related to a switch control circuit, a coupled inductor boost converter including the same, and a driving method thereof. The coupled inductor boost converter includes a first inductor connected between an input voltage and a first node, a second inductor connected between the first node and a second node, and a power switch connected between the first node and a ground, and a switch control circuit. The switch control circuit receives a voltage of the second node and turn on the power switch by using the voltage of the second node at a time when a voltage of the first node becomes a zero voltage.

15 Claims, 2 Drawing Sheets

SWITCH CONTROL CIRCUIT, COUPLED INDUCTOR BOOST CONVERTER INCLUDING THE SAME, AND DRIVING METHOD OF THE COUPLED INDUCTOR BOOST CONVERTER

CROSS-REFERENCE TO RELATED APPLICATION

This application claims priority to and the benefit of Korean Patent Application No. 10-2012-0048813 filed in the Korean Intellectual Property Office on May 8, 2012, the entire contents of which are incorporated herein by reference.

BACKGROUND OF THE INVENTION (a) Field of the Invention

An exemplary embodiment of the present invention relates to a coupled inductor boost converter including another inductor coupled to an inductor of a boost converter, and driving method thereof.

Also, an exemplary embodiment relates to a switch control circuit included in a coupled inductor boost converter.

(b) Description of the Related Art

A boost converter (hereinafter, a coupled inductor boost converter) including a first inductor and a second inductor coupled to the first inductor generally operates according to a fixed switching frequency.

Particularly, the coupled inductor boost converter turns on a power switch according to a oscillator signal, which determines a switching frequency, and determining a turn-off time of the power switch by using an output voltage of the coupled inductor boost converter and a current flowing through the power switch.

During an off period of the power switch, a current flowing through the first inductor and the second inductor decreases with a slope according to a value of a voltage of the input voltage of the coupled inductor boost converter subtracted from the output voltage divided by an inductance.

However, when the power switch is turned on according to a fixed switching frequency in the condition of a low slope, hard switching in which a current flowing through the first inductor flows to the power switch occurs.

Also, when the power switch is turned on in a case of hard switching, an excessive voltage spike in a node (a drain of the power switch) between the first inductor and the second inductor can be generated by leakage inductance of the second inductor.

The prior coupled inductor boost converter should include a separate snubber circuit in order to prevent turn-off of the power switch by the voltage spike.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a switch control circuit that prevents hard switching and does not need a snubber circuit, a coupled inductor boost converter including the switch control circuit, and a driving method of the coupled inductor boost converter.

An exemplary embodiment of the present invention provides a coupled inductor boost converter. The coupled inductor boost converter includes a first inductor connected between an input voltage and a first node, a second inductor connected between the first node and a second node, a power switch connected between the first node and a ground, and a switch control circuit for receiving a voltage of the second node and turning on a power switch at a time when a voltage of the first node is zero by using the voltage of the second node.

The coupled inductor boost converter further includes an output diode including an anode connected to the second node and a cathode connected to the output voltage.

The switch control circuit includes a zero voltage detector generating a first level on-pulse signal at a time when the voltage of the second node reaches a zero voltage and generates a gate voltage turning on the power switch according to the first level on-pulse signal.

The switch control circuit turns off the power switch according to a result of comparing an error voltage amplifying a difference between an output voltage of the coupled inductor boost converter and a predetermined reference voltage and a sense voltage according to a current flowing through the power switch.

The switch control circuit further includes an error amplifier for generating an error voltage amplifying a difference between the output voltage and the predetermined reference voltage, and a PWM controller for comparing a sense voltage according to a current flowing through the power switch and the error voltage and generating an off signal to turn off the power switch according to the comparison result.

The switch control circuit further includes an SR flip-flop for generating a gate voltage to turn on the power switch according to the on-pulse signal and a gate voltage to turn off the power switch according to an off-pulse signal.

The coupled inductor boost converter of claim further includes a clamp receiving a voltage of the second node, clamping the voltage of the second node to a first clamping voltage when the voltage of the second node is higher than a first clamping reference voltage, and clamping the voltage of the second node to a second clamping voltage when the voltage of the second node is lower than a second clamping reference voltage.

An exemplary embodiment of the present invention provides a driving method of a coupled inductor boost converter. The coupled inductor boost converter includes a first inductor including a first end connected to an input voltage, a second inductor including a first end connected to a second end of the first inductor, and a power switch connected to a first node of the first inductor and the second inductor. The driving method includes detecting a time when a voltage of a second end of the second inductor becomes a zero voltage, and turning on the power switch at the detected zero voltage time.

The turning on the power switch includes generating an on-pulse signal at the detected zero voltage time and generating a gate voltage to turn off the power switch according to the on-pulse signal.

The driving method further includes generating an error voltage by amplifying a difference between an output voltage of the coupled inductor boost converter and a predetermined reference voltage, and turning off the power switch according to the result of comparing a sense voltage according to a current flowing through the power switch and the error voltage.

An exemplary embodiment of the present invention provides a switch control circuit to control a switching operation of a power switch connected to a first inductor and a second inductor connected to an output voltage through an output diode. The switch control circuit includes a zero voltage detector generating an on-pulse signal at a time when a voltage of a node connected to the second inductor and the output diode becomes a zero voltage, and an SR flip-flop turning on the power switch according to the on-pulse signal.

The switch control circuit turns off the power switch according to the result of comparing an error voltage generated by amplifying a difference between the output voltage and a predetermined reference voltage and the sense voltage according to a current flowing through the power switch.

The switch control circuit further includes an error amplifier that generates the error voltage by amplifying the difference between the output voltage and the predetermined reference voltage, and a PWM controller that compares the sense voltage according to the current flowing through the power switch and the error voltage and generates an off signal to turn off the power switch according to the comparison result.

The SR flip-flop includes a set end received the on-pulse signal and a reset end R received the off signal, and it generates a gate voltage to turn on the power switch according to the on-pulse signal and a gate voltage to turn off the power switch according to the off-pulse signal.

The switch control circuit further includes a clamp receiving a voltage of the second node, clamping the voltage of the second node to a first clamping voltage when the voltage of the second node is higher than a first clamping reference voltage, and clamping the voltage of the second node to a second clamping voltage when the voltage of the second node is lower than a second clamping reference voltage.

According to an exemplary embodiment of the present invention, a switch control circuit that prevents hard switching and does not need a snubber circuit, a coupled inductor boost converter including the switch control circuit, and a driving method of the coupled inductor boost converter are provided.

DETAILED DESCRIPTION OF THE EMBODIMENTS

Figure 1:
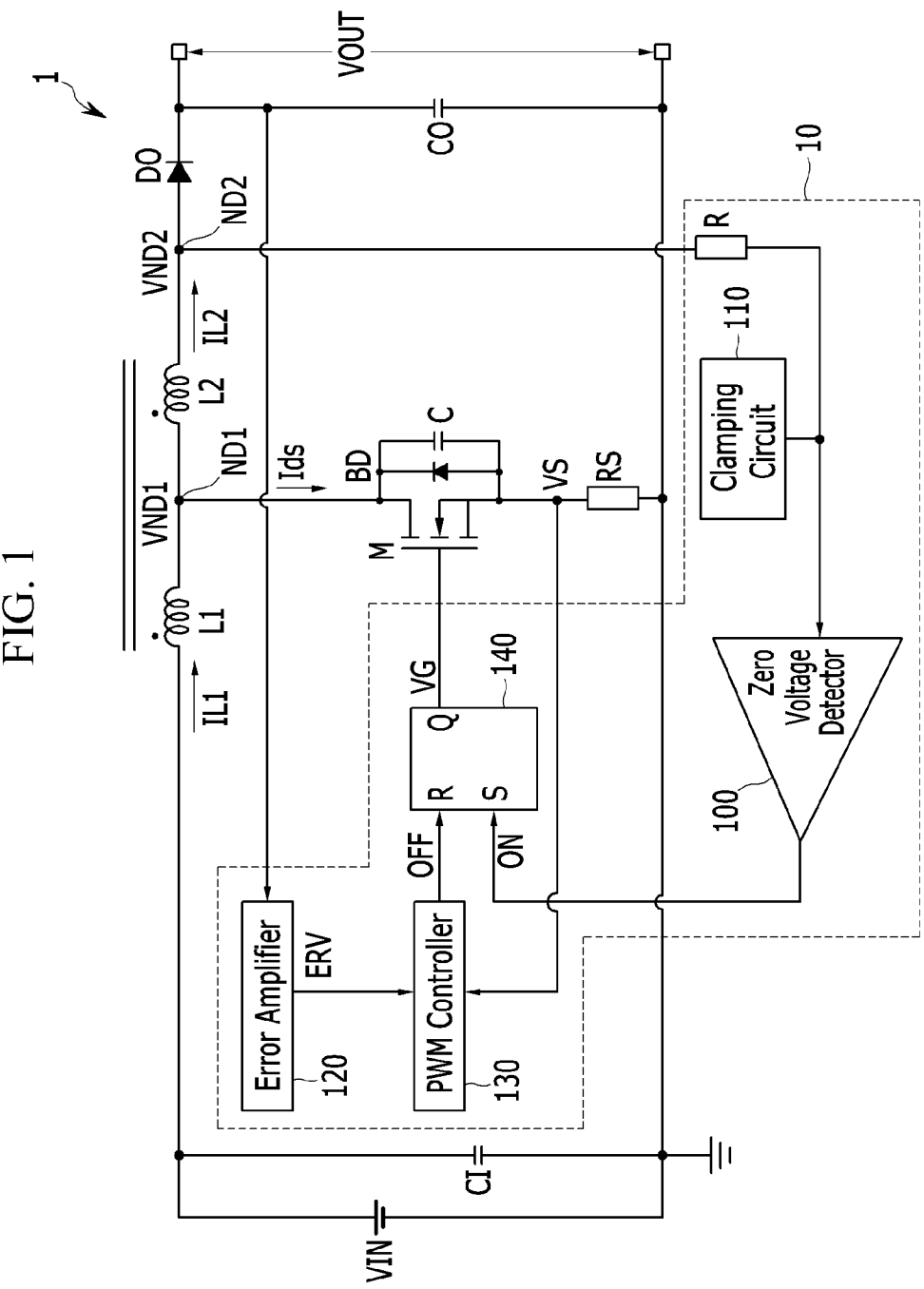
FIG. 1 shows a coupled inductor boost converter according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element.

In addition, unless explicitly described to the contrary, the word "comprise" and variations such as "comprises" or "comprising" will be understood to imply the inclusion of stated elements but not the exclusion of any other elements.

Hereinafter, referring to the drawings, a switch control circuit, a coupled inductor boost converter including the same, and a driving method thereof according to an exemplary embodiment of the present invention will be described.

FIG. 1 shows a coupled inductor boost converter according to an exemplary embodiment of the present invention.

As shown in FIG. 1, a coupled inductor boost converter 1 includes a switch control circuit 10, a first inductor L1, a second inductor L2, a power switch M, a smoothing capacitor CI, an output capacitor CO, an output diode DO, and a sense resistor RS.

The power switch M is an NMOSFET (n-channel metal-oxide semiconductor field-effect transistor).

A body diode BD and a parasitic capacitor C are connected in parallel between a drain electrode and a source electrode of the power switch M.

A gate electrode of the power switch M is connected to a gate voltage VG transmitted from the switch control circuit 10.

According to an exemplary embodiment of the present invention, an enable level of the gate voltage VG is a high level, and a disable level thereof is a low level.

The sense resistor RS is connected between the source electrode of the power switch M and a ground.

A drain current of the power switch M flows through the sense resistor RS and a sense voltage VS occurs at the sense resistor RS.

The smoothing capacitor CI is connected to an input voltage VIN and smoothes the input voltage VIN.

The first inductor L1 includes a first end connected to the smoothed input voltage VIN, and a second end connected to the drain electrode of the power switch M and the second inductor L2.

A number of windings of the first inductor L1 is "N1".

The second inductor L2 includes a first end connected to the second end of the first inductor L1 and the drain electrode of the power switch M, and a second end connected to an anode of the output diode DO.

A number of windings of the second inductor L2 is "N2".

The second end of the first inductor L1, the drain electrode of the power switch M, and the first end of the second inductor L2 are connected to a node ND.

A voltage VND1 of the node ND1 is the same as a voltage of the drain electrode of the power switch M.

A cathode of an output diode DO is connected to an output capacitor CO, and a voltage of both ends of the output capacitor CO is an output voltage VOUT.

The output diode DO is reverse biased during the turned-on period of the power switch M, and no current flows through the output diode DO.

When the power switch M is turned off, the output diode DO conducts and a current (hereinafter the second inductor current) IL2 of the second inductor L2 flows through the output diode DO.

The switch control circuit 10 detects a time of a zero voltage of the power switch M by using a voltage VND2 of a node ND2 connected to the second inductor L2 and the output diode DO, and turns on the power switch M at the detected zero voltage time.

The voltage VND2 is a voltage corresponding to a drain electrode voltage VND1 of the power switch M.

Also, the switch control circuit 10 turns on the power switch M according to the comparison result between a voltage amplified error between an output voltage VOUT and a predetermined reference voltage, and a sense voltage VS.

The switch control circuit 10 includes a zero voltage detector 100, a clamping circuit 110, an error amplifier 120, a PWM controller 130, and an SR flip-flop 140.

The clamping circuit 110 clamps the voltage VND2 transmitted through a resistor R to not get out of a predetermined clamping voltage range.

For example, when the voltage VND2 is higher than a first clamping reference voltage, the clamping circuit 110 changes the voltage VND2 to the first clamping voltage, and when the voltage VND2 is lower than a second clamping reference voltage, the clamping circuit 110 changes the voltage VND2 to the second clamping voltage.

During a turned-off period of the power switch M, the output diode DO conducts and the voltage VND2 is a high voltage near the output voltage VOUT.

The clamping circuit 110 clamps the voltage VND2 to a high clamping voltage (for example, the first clamping voltage) to protect internal elements of the switch control circuit 100.

During the turned-on period of the power switch M, the voltage VND1 becomes 0 V and a voltage (−VIN*(N2/N1)) of which the winding ratio (N2/N1) between the second inductor L2 and the first inductor L1 and the voltage −VIN between both ends of the first inductor L1 are multiplied is induced at the node ND2.

That is, the voltage VND2 becomes −(N2/N1)*VIN, and in order to protect the internal elements of the switch control circuit 100 by the negative potential, the clamping circuit 110 clamps the voltage VND2 to a low clamping voltage (for example, the second clamping voltage).

The zero voltage detector 100 senses a time when the voltage VND2 reaches a zero voltage as a zero voltage cross time, and generates an on-pulse signal ON in synchronization with the zero voltage cross time.

For example, when the voltage VND1 reaches the zero voltage, the voltage VND2 also reaches the zero voltage.

The zero voltage detector 100 compares the voltage VND2 and the zero voltage and generates a high level on-pulse signal ON at the time when the voltage VND2 reaches the zero voltage.

The error amplifier 120 receives the output voltage VOUT and generates an error voltage ERV by amplifying a difference between the predetermined reference voltage and the output voltage VOUT.

The PWM controller 130 compares the error voltage ERV and the sense voltage VS and generates an off signal OFF to turn off the power switch M according to the comparison result.

In detail, the PWM controller 130 generates a high level off signal OFF when the sense voltage VS is higher than the error voltage ERV, and generates the low level off signal OFF when the sense voltage VS is lower than the error voltage ERV.

The SR flip-flop 140 includes a set end S and a reset end R, and generates a high level signal according to the input signal of the set end S and a low level signal according to the input signal of the reset end R. The on-pulse signal ON is input to the set end S and the off signal OFF is input to the reset end R.

In an exemplary embodiment of the present invention, the output signal of the SR flip-flop 140 is a gate voltage VG, but the present invention is not limited to the disclosed embodiments. The switch control circuit 10 further includes a gate driver generating a gate voltage VG according to the output signal of the SR flip-flop 140.

Hereinafter, referring to FIG. 2, operation of the coupled inductor boost converter according to an exemplary embodiment will be described.

Figure 2:
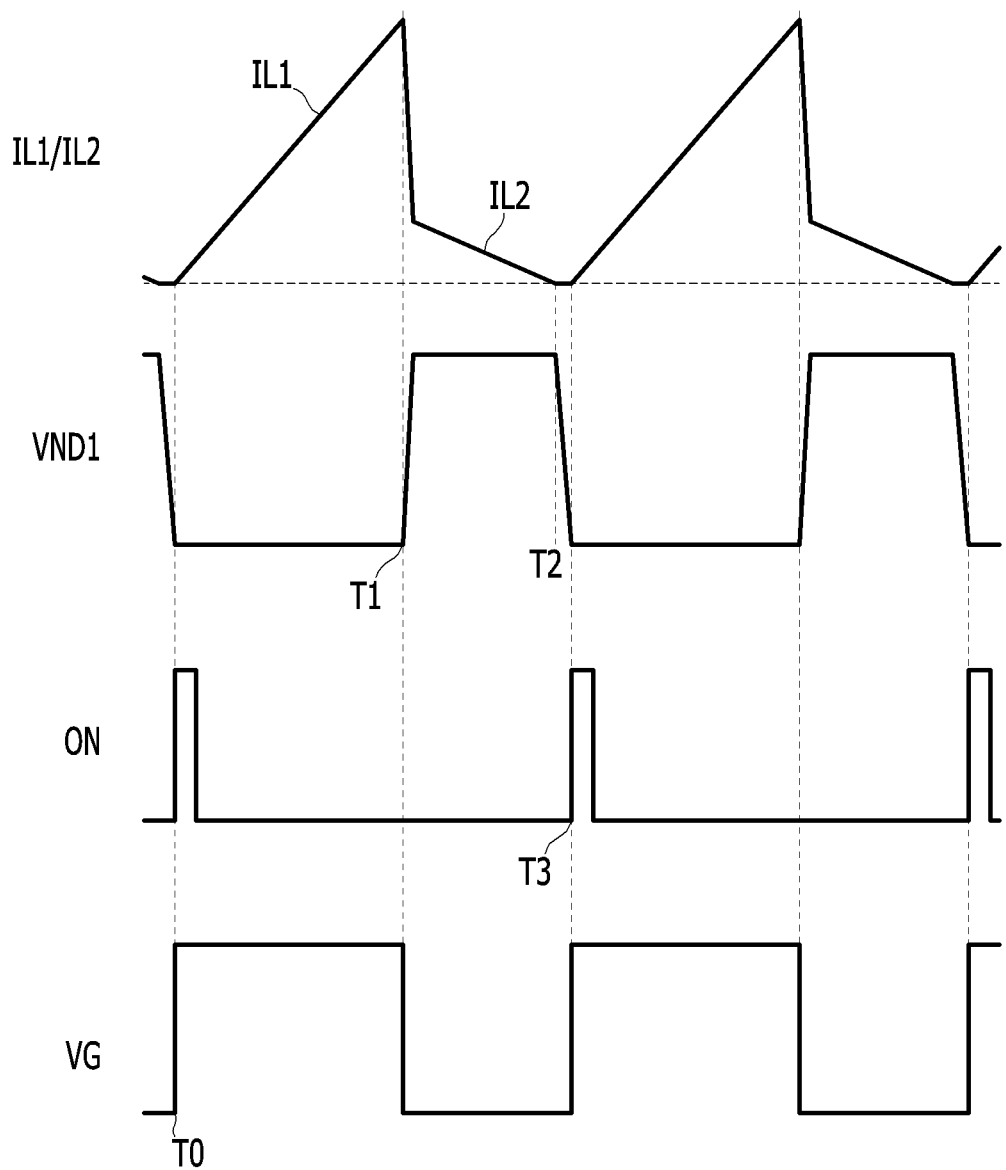
FIG. 2 shows a first inductor current, a second inductor current, a drain voltage, an on-pulse signal, and a gate voltage according to an exemplary embodiment of the present invention.

FIG. 2 shows a first inductor current, a second inductor current, a drain voltage, an on-pulse signal, and a gate voltage according to an exemplary embodiment of the present invention.

Firstly, according to a high level on-pulse signal ON at the time T0, the SR flip-flop 140 generates a high level gate voltage VG.

Then, the power switch M is turned on.

During the period T0-T1 when the power switch M is turned on, a current flows through the first inductor L1 and the power switch M.

The first inductor current IL1 is increased according to a slope determined by the input voltage VIN, and energy is stored to the first inductor L1.

During the period T0-T1, the output diode DO does not conduct and a current does not flow through the second inductor L2.

During the period T0-T1, a current from the output capacitor CO is supplied to the output voltage VOUT.

During the period T0-T1, since a drain current Ids is the same as the first inductor current IL1, the sense voltage VS is increased according to the first inductor current IL1.

At the time T1, the increased sense voltage VS reaches the error voltage ERV and the PWM controller 130 generates a high level off signal OFF.

Then, at the time T1, the SR flip-flop 140 generates a low level gate voltage VG and the power switch M is turned off.

When the power switch M is turned off, the first inductor current IL1 is transmitted to the second inductor L2 according to the winding ratio N2/N1.

The output diode DO conducts after the power switch M is turned off.

Accordingly, the second inductor current IL2 flows through the output diode DO to the output voltage VOUT.

During the period T1-T2, the second inductor current IL2 is generated by the energy stored to the first inductor L1, and the second inductor current IL2 flows through the second inductor L2.

At the time T2, the energy stored to the first inductor L1 is consumed, the first inductor current IL1 becomes zero, and the second inductor current IL2 also becomes zero.

Then, the output diode DO is turned off and the drain voltage VND1 starts to be decreased from the time T2 by resonance between a parasitic capacitor C of the power switch M and the first and second inductors L1 and L2.

At a time T3, when the decreased drain voltage VND1 reaches a zero voltage, the zero voltage detector 100 generates a high level on-pulse signal ON.

Then, at the time T3, the SR flip-flop 140 generates the high level gate voltage VG and the power switch M is turned on.

Such operation is repeated, and when the drain-source voltage of the power switch M is a zero voltage, the switching operation of the power switch M is performed. Therefore, soft-switching is attained.

According to an exemplary embodiment of the present invention, hard switching is prevented and an excessive spike voltage caused by leakage inductance of the second inductor can be prevented by soft switching.

Accordingly, a coupled inductor boost converter without a snubber circuit can be provided.

While this invention has been described in connection with what is presently considered to be practical exemplary embodiments, it is to be understood that the invention is not limited to the disclosed embodiments, but, on the contrary, is

DESCRIPTION OF SYMBOLS

| | |
|---|---|
| coupled inductor boost converter 1 | switch control circuit 10 |
| first inductor L1 | second inductor L2 |
| power switch M | smoothing capacitor CI |
| output capacitor CO | output diode DO |
| sense resistor RS | zero voltage detector 100 |
| clamping circuit 110 | error amplifier 120 |
| PWM controller 130 | SR flip-flop 140 |

What is claimed is:

1. A coupled inductor boost converter comprising:
a first inductor including a first end coupled to an input voltage and a second end directly coupled to a first node;
a second inductor including a first end directly coupled to the first node and a second end;
a power switch coupled between the first node and a ground; and
a switch control circuit configured to measure a voltage at the second end of the second inductor and turn on the power switch based on the voltage of the second node when a voltage of the first node is zero voltage.

2. The coupled inductor boost converter of claim 1, further comprising an output diode including an anode coupled to the second node and a cathode coupled to an output voltage.

3. The coupled inductor boost converter of claim 2, wherein the switch control circuit includes a zero voltage detector configured to generate a first level on-pulse signal when the voltage of the second node reaches a zero voltage, the switch control circuit being configured to generate a gate voltage for turning on the power switch based on the first level on-pulse signal.

4. The coupled inductor boost converter of claim 3, wherein the switch control circuit is configured to turn off the power switch based on a result of a comparison between an error voltage and a sense voltage.

5. The coupled inductor boost converter of claim 4, wherein the switch control circuit further comprises:
an error amplifier configured to generate the error voltage by amplifying a difference between the output voltage of the coupled inductor boost converter and a predetermined reference voltage; and
a PWM controller configured to compare the error voltage with the sense voltage based on a current flowing through the power switch and generate an off signal to turn off the power switch based on the comparison result.

6. The coupled inductor boost converter of claim 5, wherein the switch control circuit further comprises an SR flip-flop configured to generate the gate voltage to turn on the power switch based on the on-pulse signal and a gate voltage to turn off the power switch based on an off-pulse signal.

7. The coupled inductor boost converter of claim 1, further comprising a clamp configured to receive and clamp a voltage of the second node to a first clamping voltage when the voltage of the second node is higher than a first clamping reference voltage, the clamp being further configured to clamp the voltage of the second node to a second clamping voltage when the voltage of the second node is lower than a second clamping reference voltage.

8. A method of driving a coupled inductor boost converter, said method comprising:
providing a coupled inductor boost converter, said coupled inductor boost converter comprising:
a first inductor including a first end coupled to an input voltage and a second end directly coupled to a first node,
a second inductor including a first end directly coupled to the first node and a second end, and
a power switch connected to the first node;
detecting a time when a voltage measured at the second end of the second inductor becomes a zero voltage; and
turning on the power switch at the detected zero voltage time.

9. The method of claim 8, wherein turning on the power switch comprises:
generating an on-pulse signal at the detected zero voltage time; and
generating a gate voltage to turn on the power switch based on the on-pulse signal.

10. The method of claim 8, further comprising:
generating an error voltage by amplifying a difference between an output voltage of the coupled inductor boost converter and a predetermined reference voltage; and
turning off the power switch based on a comparison between the error voltage and a sense voltage based on a current flowing through the power switch.

11. A switch control circuit for controlling a switching operation of a power switch coupled directly to a first node, the first node coupled directly to a second end of a first inductor and to a first end of a second inductor, the first inductor and the second inductor coupled to an output voltage through an output diode, said switch control circuit comprising:
a zero voltage detector configured to generate an on-pulse signal when a voltage of a second node coupled directly to a second end of the second inductor and coupled directly to the output diode becomes a zero voltage; and
an SR flip-flop configured to turn on the power switch based on the on-pulse signal.

12. The switch control circuit of claim 11, wherein the switch control circuit is configured to turn off the power switch based on a result of a comparison between an error voltage a sense voltage corresponding to a current flowing through the power switch.

13. The switch control circuit of claim 12, further comprising:
an error amplifier configured to generate the error voltage by amplifying a difference between the output voltage and a predetermined reference voltage; and
a PWM controller configured to compare the error voltage with the sense voltage based on the current flowing through the power switch and generate an off signal to turn off the power switch based on the comparison result.

14. The switch control circuit of claim 13, wherein the SR flip-flop comprises a set end configured to receive the on-pulse signal and a reset end R configured to receive the off signal, the SR flip-flop being configured to generate a gate voltage to turn on the power switch based on the on-pulse signal and a gate voltage to turn off the power switch according to the off-pulse signal.

15. The switch control circuit of claim 11, further comprising a clamp configured to receive and clamp a voltage of the node coupled to the second inductor to a first clamping voltage when the voltage of the node is higher than a first clamping reference voltage, the clamp being further configured to clamp the voltage of the node to a second clamping voltage when the voltage of the node is lower than a second clamping reference voltage.

* * * * *